US012677141B2

(12) United States Patent
Centonza et al.

(10) Patent No.: US 12,677,141 B2
(45) Date of Patent: Jul. 7, 2026

(54) REQUEST TO STORE INFORMATION FOR A PLURALITY OF CELLS

(71) Applicant: Telefonaktiebolaget LM Ericsson (publ), Stockholm (SE)

(72) Inventors: Angelo Centonza, Torrenueva Costa (ES); Ioanna Pappa, Stockholm (SE); Patrik Jonasson, Nykil (SE); Thomas Walldeen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 574 days.

(21) Appl. No.: 17/925,132

(22) PCT Filed: May 20, 2021

(86) PCT No.: PCT/SE2021/050480
§ 371 (c)(1),
(2) Date: Nov. 14, 2022

(87) PCT Pub. No.: WO2021/236004
PCT Pub. Date: Nov. 25, 2021

(65) Prior Publication Data
US 2023/0199481 A1      Jun. 22, 2023

Related U.S. Application Data

(60) Provisional application No. 63/027,613, filed on May 20, 2020.

(51) Int. Cl.
*H04W 8/30* (2009.01)
*H04W 24/04* (2009.01)

(52) U.S. Cl.
CPC ............. *H04W 8/30* (2013.01); *H04W 24/04* (2013.01)

(58) Field of Classification Search
CPC ... H04W 8/30; H04W 24/04; H04W 28/0864; H04W 88/085; H04W 24/02
See application file for complete search history.

(56) References Cited

U.S. PATENT DOCUMENTS

2018/0220342 A1* 8/2018 Farooqi ............. H04W 36/0061
2019/0110205 A1* 4/2019 Shaik ................ H04W 36/0085
(Continued)

FOREIGN PATENT DOCUMENTS

| JP | H09233533 A | * | 9/1997 |
| JP | 2004200789 A | | 7/2004 |

OTHER PUBLICATIONS

ZTE: "Clarification of network sharing for TS38.473",3GPP Draft; R3-192280, vol. RAN WG3, No. Reno, USA; May 13, 2019-May 2019 (Year: 2019).*

(Continued)

*Primary Examiner* — Yuwen Pan
*Assistant Examiner* — Swati Jain
(74) *Attorney, Agent, or Firm* — Murphy, Bilak & Homiller, PLLC

(57) ABSTRACT

An example of this disclosure provides a method (500) performed by a base station control unit (CU). The method comprises receiving (502) a request from a base station distributed unit (DU) to store information for a first plurality of cells to be served by the base station DU. The method also comprises sending (504) a response to the base station DU, wherein the response indicates that storing information for the first plurality of cells would exceed a maximum number of cells that can be stored by the base station CU.

24 Claims, 16 Drawing Sheets

500

Receiving a request from a base station distributed unit (DU) to store information for a first plurality of cells to be served by the base station DU ---- 502

Sending a response to the base station DU, wherein the response indicates that storing information for the first plurality of cells would exceed a maximum number of cells that can be stored by the base station CU ---- 504

(56) References Cited

U.S. PATENT DOCUMENTS

| | | | | |
|---|---|---|---|---|
| 2019/0327133 A1* | 10/2019 | Gao | ...................... | H04W 48/16 |
| 2021/0014722 A1* | 1/2021 | Han | .................. | H04W 28/0268 |
| 2021/0227378 A1* | 7/2021 | Wang | ...................... | H04W 8/26 |
| 2022/0159768 A1* | 5/2022 | Zhu | ....................... | H04L 1/1874 |
| 2022/0369119 A1* | 11/2022 | Vaidya | .................. | H04W 24/02 |

OTHER PUBLICATIONS

3GPP , "3rd Generation Partnership Project; Technical Specification Group Radio Access Network; NG-RAN; F1 application protocol (F1AP) (Release 15)", 3GPP TS 38.473 V15.6.0, Jul. 2019, 1-220.
3GPP , "3rd Generation Partnership Project; Technical Specification Group Radio Access Network; NG-RAN; F1 application protocol (F1AP) (Release 16)", 3GPP TS 38.473 V16.1.0, Mar. 2020, 1-240.
3GPP , "3rd Generation Partnership Project; Technical Specification Group Radio Access Network; NG-RAN; Xn application protocol (XnAP) (Release 16)", 3GPP TS 38.423 V16.1.0, Mar. 2020, 1-334.
3GPP , "3rd Generation Partnership Project; Technical Specification Group Services and System Aspects; 3GPP System Architecture Evolution (SAE); Security architecture (Release 16)", 3GPP TS 33.401 V16.2.0, Mar. 2020, 1-167.
Unknown, Author , "ETSI TS 138 401 V15.5.0", 5G; NG-RAN; Architecture description (3GPP TS 38.401 version 15.5.0 Release 15), May 2019, 1-41.
ZTE , "Clarification of network sharing for TS38.473", 3GPP TSG RAN WG3 Meeting #104, R3-192280, Reno, USA, May 13-17, 2019, 1-39.

* cited by examiner

500

502

Receiving a request from a base station distributed unit (DU) to store information for a first plurality of cells to be served by the base station DU

504

Sending a response to the base station DU, wherein the response indicates that storing information for the first plurality of cells would exceed a maximum number of cells that can be stored by the base station CU

600

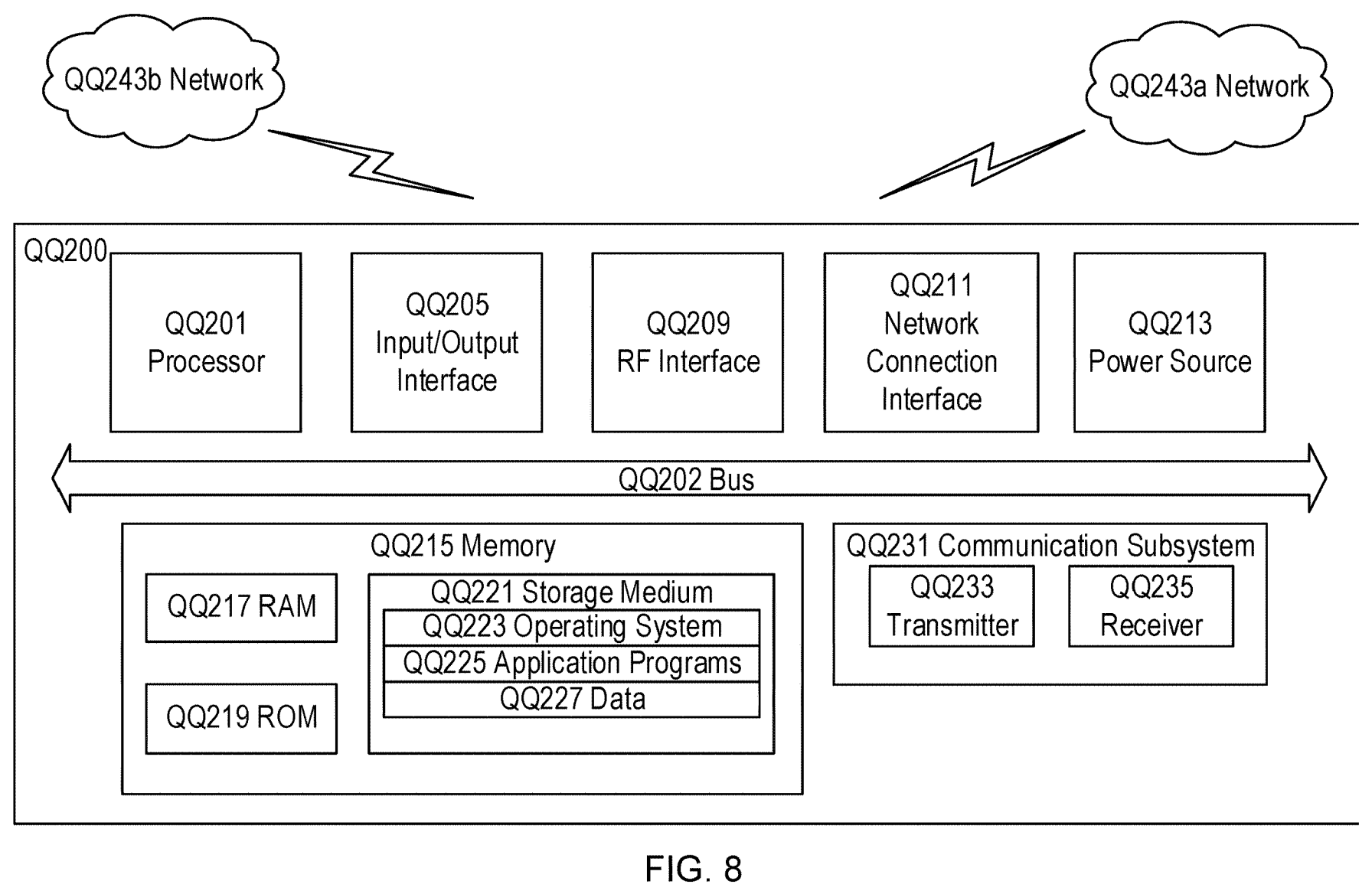

QQ243a Network

QQ243b Network

QQ200

QQ201 Processor

QQ205 Input/Output Interface

QQ209 RF Interface

QQ211 Network Connection Interface

QQ213 Power Source

QQ202 Bus

QQ215 Memory

QQ217 RAM

QQ219 ROM

QQ221 Storage Medium

QQ223 Operating System

QQ225 Application Programs

QQ227 Data

QQ231 Communication Subsystem

QQ233 Transmitter

QQ235 Receiver

FIG. 8

WW00 Virtual Apparatus

WW02 Sending Unit

WW04 Receiving Unit

WW06 Virtual Apparatus

WW08 Receiving Unit

WW10 Sending Unit

REQUEST TO STORE INFORMATION FOR A PLURALITY OF CELLS

TECHNICAL FIELD

Examples of this disclosure relate to storing information for a plurality of cells, and a request to store information for a plurality of cells. Examples may include methods performed by a base station control unit (CU) or distributed unit (DU).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

5G RAN Architecture

The current 5G RAN (NG-RAN) architecture is depicted and described in TS 38.401 v15.5.0 and is shown in FIG. 1. The NG architecture can be further described as follows:

The NG-RAN consists of a set of gNBs connected to the 5GC through the NG interface.

A gNB can support FDD mode, TDD mode or dual mode operation.

gNBs can be interconnected through the Xn interface.

A gNB may consist of a gNB-CU (control unit) and gNB-DUs (distributed units). A gNB-CU and a gNB-DU are connected via F1 logical interface.

One gNB-DU is connected to only one gNB-CU.

NOTE: For resiliency, a gNB-DU may be connected to multiple gNB-CUs by appropriate implementation.

NG, Xn and F1 are logical interfaces. The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport, signalling transport. If security protection for control plane and user plane data on TNL of NG-RAN interfaces has to be supported, NDS/IP (3GPP TS 33.401 shall be applied).

A gNB may also be connected to an LTE eNB via the X2 interface. Another architectural option is that where an LTE eNB connected to the Evolved Packet Core network is connected over the X2 interface with a so called en-gNB. The latter is a gNB not connected directly to a CN and connected via X2 interface to an eNB for the sole purpose of performing dual connectivity.

The architecture in FIG. 1 can be expanded by spitting the gNB-CU into two entities. In the split architecture option, the RAN protocol stack functionality is separated in different parts. The CU-CP is expected to handle the RRC layer, the CU-UP will handle the PDCP layer and the DU will handle the RLC, MAC and PHY layer of the protocol stack. In some further examples, the DU can have a separated unit that handles the PHY parts separately compared to RLC and MAC layers that are handled in a DU.

FIG. 2 shows an example of a RAN node split architecture. As shown in FIG. 2, different units handle different protocol stack functionalities, and there may be inter-node communication between the DU, the CU-UP and the CU-CP. This may be achieved via F1-C interface related to control plane signaling, via F1-U interface related to user plane signaling for communication between CU and DU and via E1 interface for communication between CU-UP and CU-CP.

The E1 interface is a logical interface. It supports the exchange of signalling information between the endpoints. From a logical standpoint, the E1 is a point-to-point interface between a gNB-CU-CP and a gNB-CU-UP. The E1 interface enables exchange of UE associated information and non-UE associated information. The E1 interface is a control interface and is not used for user data forwarding.

E-UTRAN Split Architecture

The split RAN architecture described above for the NG RAN is also replicated in E-UTRAN. In E-UTRAN a similar node structure than in the NG RAN can be encountered, namely the E-UTRAN is split into an eNB-DU and an eNB-CU, where the eNB-DU hosts the RLC/MAC/PHY protocols and where the gNB-CU hosts the PDCP and RRC protocols. A split eNB connects to other RAN nodes via the X2 interface and with the EPC CN system via the S1 interface. FIG. 3 shows an example of a split E-UTRAN architecture so far defined in 3GPP.

Cell Creation in Split RAN Architectures

The following procedure is defined in current specifications regarding cell creation in split RAN architectures.

FIG. 4 shows an example of F1 interface startup and cell activation. This procedure allows to setup the F1 interface between a gNB-DU and a gNB-CU and it allows to activate the gNB-DU cells, and comprises the following steps:

0. The gNB-DU and its cells are configured by OAM in the F1 pre-operational state. The gNB-DU has TNL connectivity toward the gNB-CU.

1. The gNB-DU sends an F1 SETUP REQUEST message to the gNB-CU including a list of cells that are configured and ready to be activated.

2. In NG-RAN, the gNB-CU ensures the connectivity toward the core network. For this reason, the gNB-CU may initiate either the NG Setup or the gNB Configuration Update procedure towards 5GC.

3. The gNB-CU sends an F1 SETUP RESPONSE message to the gNB-DU that optionally includes a list of cells to be activated. The cells in the list of cells to be activated in F1 SETUP RESPONSE message become active, while the cells not in the list are inactive. The cells that are active are Out-of-Service until the gNB-DU indicates that they are In-Service. The gNB-DU will initiate the gNB-DU Configuration Update procedure towards the gNB-CU and includes the cell(s) that are In-Service and/or the cell(s) that are Out-Of-Service. The gNB-DU may also indicate cell(s) to be deleted, in which case the gNB-CU removes the corresponding cell(s) information.

4. The gNB-CU may send a GNB CU CONFIGURATION UPDATE message to the gNB-DU that optionally includes a list of cells to be activated, e.g., in case that these cells were not activated using the F1 SETUP RESPONSE message.

5. The gNB-DU replies with a GNB CU CONFIGURA-TION UPDATE ACKNOWLEDGE message that optionally includes a list of cells that failed to be activated. The gNB-CU regards all Active cells as Out-Of-Service until the gNB-DU indicates that they are In-Service.

6. The gNB-CU may initiate either the Xn Setup or the NG-RAN Node Configuration Update towards a neighbour NG-RAN node or the EN-DC X2 Setup or the EN-DC Configuration Update procedure towards a neighbour eNB.

NOTE 1: For NG-RAN in case that the F1 SETUP RESPONSE message is not used to activate any cell, step 2 may be performed after step 3.

Over the F1 interface between a gNB-CU and a gNB-DU pair, the following two Cell States are possible:

Inactive: the cell is known by both the gNB-DU and the gNB-CU. The cell shall not serve UEs;

Active: the cell is known by both the gNB-DU and the gNB-CU. The cell should try to provide services to the UEs.

The gNB-CU decides whether the Cell State should be "Inactive" or "Active". The gNB-CU can request the gNB-DU to change the Cell State using the F1 SETUP RESPONSE, the GNB DU CONFIGURATION UPDATE ACKNOWLEDGE, or the GNB CU CONFIGURATION UPDATE messages.

The gNB-DU reports to the gNB-CU the Service Status. The Service Status is the state of the radio transmission over the air. The Service Status is reported by the gNB-DU for cells for which the Cell State is "Active". The following Service Status are defined:

In-Service: the cell is operational and able to serve UEs.

Out-Of-Service: the cell is not operational, and it is not able to serve UEs. The gNB-DU is trying to make the cell operational.

The gNB-DU reports the Service Status using the GNB DU CONFIGURATION UPDATE message.

NOTE 2: If gNB-DU regards that one or more cells cannot become operational, the gNB-DU deletes them and reports them using the GNB DU CONFIGURATION UPDATE message.

To the above it needs to be added that a gNB-DU can signal to the gNB-CU more cells that are ready to be activated by triggering a gNB-DU Configuration Update procedure. Just like in the F1 Setup Request message, the gNB-DU can add a Served Cells To Add List IE to the gNB-DU Configuration update, which includes cells that are ready to be activated by the gNB-CU There currently exist certain challenge(s). For example, when a gNB-DU signals to a gNB-CU the addition of a served cell, the gNB-CU will need to "create" a new cell and store information relating to it. After such process, the gNB-CU can decide to activate certain cells. However, the gNB-CU will need to store (i.e. create) information about all the served cells signalled by the gNB-DU in order to be able to activate any of such cells at any point in time.

In TS 38.423v16.1.0 it is described that an NG RAN node can support a maximum of 16384 cells. That maximum value was agreed with the idea of having a maximum that would allow for sufficient margin for future expansions. In TS 38.473v16.1.0 a gNB-DU is assumed to have a maximum of 512 served cells. In the case where gNB-DUs using the maximum number of cells are deployed, 32 gNB-DUs can be connected to a gNB-CU. It is likely that more than 32 gNB-DUs could be connected to a gNB-CU.

Without going to such extreme, and assuming that a gNB-CU supports less than 16384 cells, it is evident that there can be cases where such maximum number is exceeded due to gNB-DUs connecting to the gNB-CU and signalling new served cells information that the gNB-CU will need to store.

The problem with the current 3GPP solution occurs when the gNB-CU has already a number of stored served cells close to its maximum number of supported cells. In this scenario, the gNB-CU receives a request from a gNB-DU (e.g. in the form of an F1 Setup Request) to add more cells, thereby exceeding its max number of supported cells. In TS 38.473v16.1.0 there is not an adequate guidance on how to handle this case. The only option for the gNB-CU is to reject the full procedure. If for example new served cells are added via the F1 Setup procedure and if these cells exceed the total maximum number of cells a gNB-CU can support, the F1 Setup procedure will have to be failed. This is a very critical error because it may lead to never being able to setup an F1 and therefore to not being able to connect a gNB-DU to a gNB-CU.

SUMMARY

Certain aspects of the present disclosure and their embodiments may provide solutions to these or other challenges. Example methods described herein may apply to all radio access network (RAN) architectures that follow a split similar to that of the NG RAN and the E-UTRAN architecture. Thus any method described herein can be applied to either of these example technologies or any other RAN technologies or architectures. Without loss of generality, examples described herein are described in the context of the NG-RAN system and describes the methods with respect to a split gNB architecture. However, these methods may also be applied to other systems including, but not limited to, the split eNB node in E-UTRAN.

There are, proposed herein, various embodiments which address one or more of the issues disclosed herein. For example, according to one aspect of this disclosure, there is provided a method performed by a base station control unit (CU). The method comprises receiving a request from a base station distributed unit (DU) to store information on a first plurality of cells to be served by the base station DU, and sending a response to the base station DU, wherein the response indicates that storing information on the first plurality of cells would exceed a maximum number of cells that can be stored by the base station CU.

According to another aspect of this disclosure, there is provided a method performed by a base station distributed unit (DU). The method comprises sending a request to a base station control unit (CU) to store information for a first plurality of cells to be served by the base station DU, and receiving a response from the base station CU, wherein the response indicates that storing information on the first plurality of cells would exceed a maximum number of cells that can be stored by the base station CU.

BRIEF DESCRIPTION OF THE FIGURES

For a better understanding of examples of the present disclosure, and to show more clearly how the examples may be carried into effect, reference will now be made, by way of example only, to the following drawings in which:

FIG. 8 shows an example of a User Equipment in accordance with some embodiments;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Certain embodiments may provide one or more of the following technical advantage(s). For example, using examples of the method proposed herein it may be possible to avoid deadlocks in which a procedure is always failed due to exceeding the maximum number of supported cells at gNB-CU.

Figure 1:
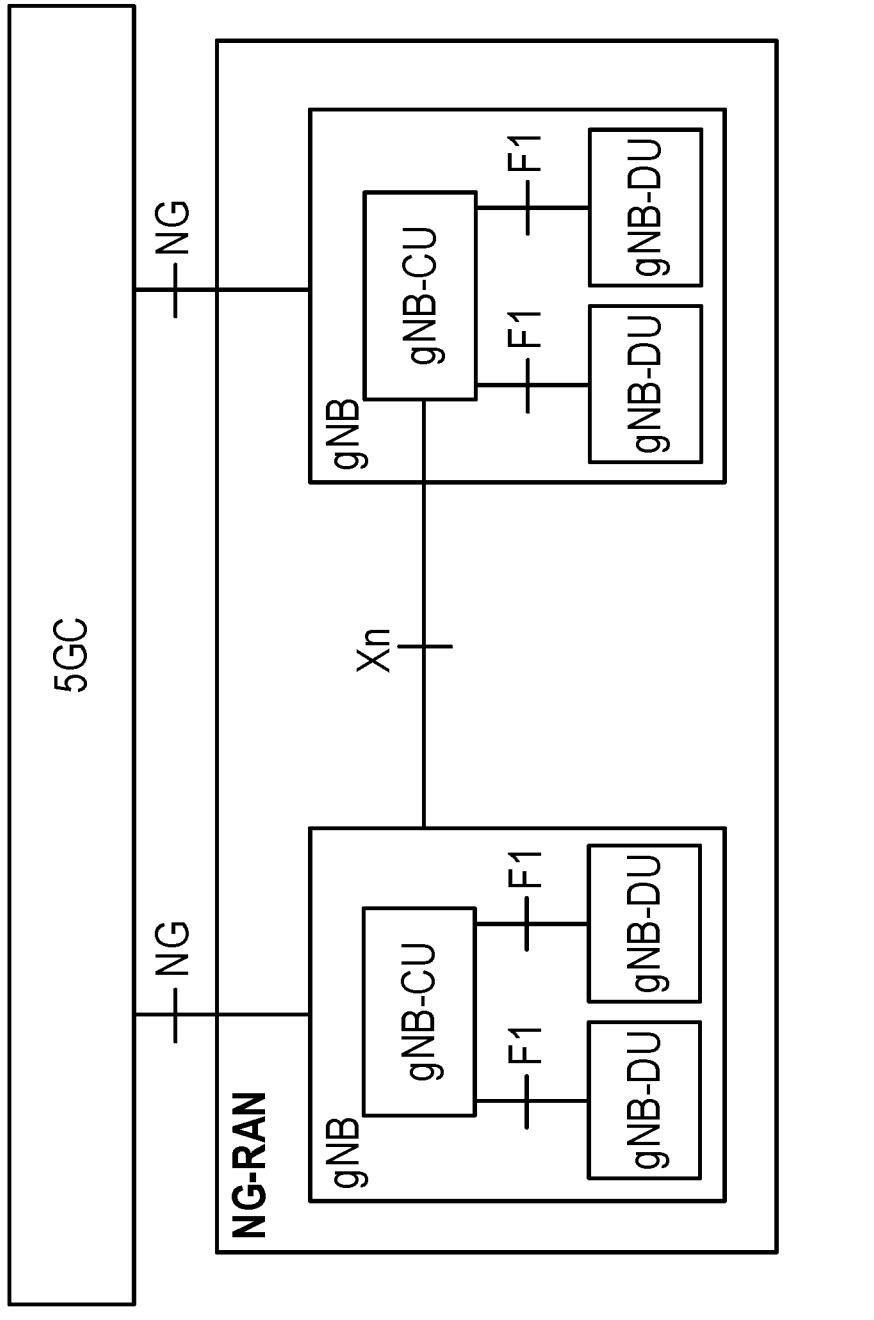
FIG. 1 shows the current 5G RAN (NG-RAN) architecture.
Figure 2:
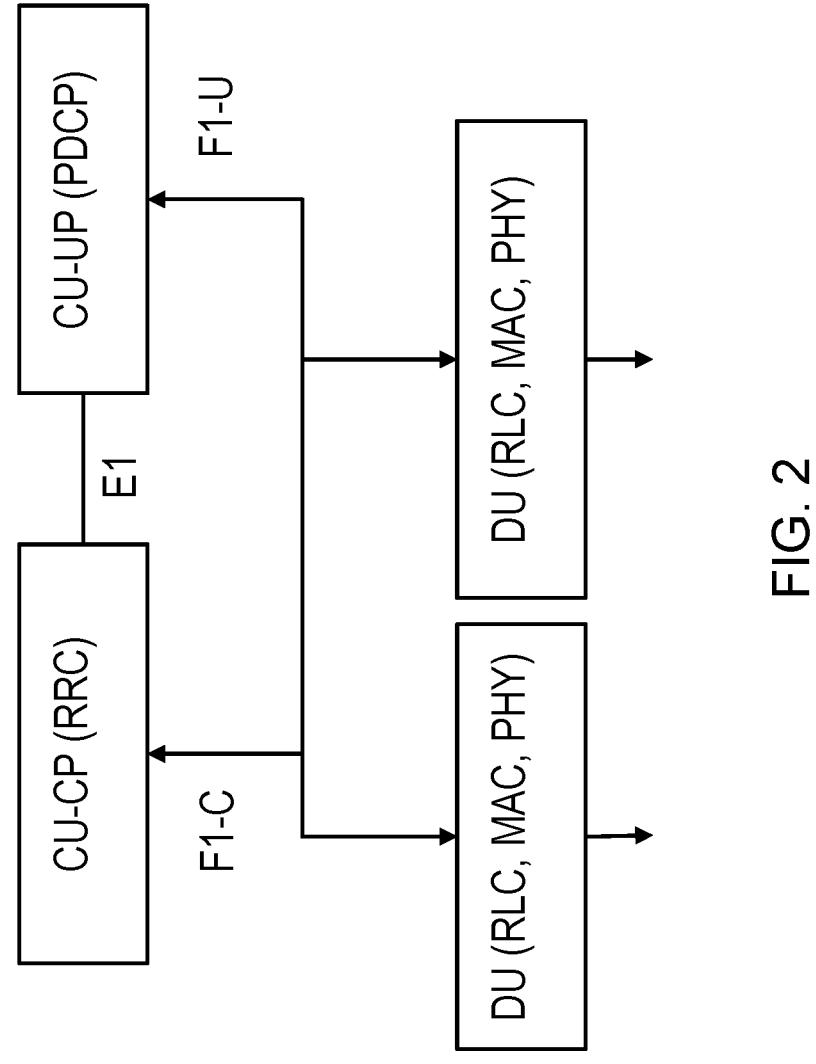
FIG. 2 shows an example of a RAN node split architecture.
Figure 3:
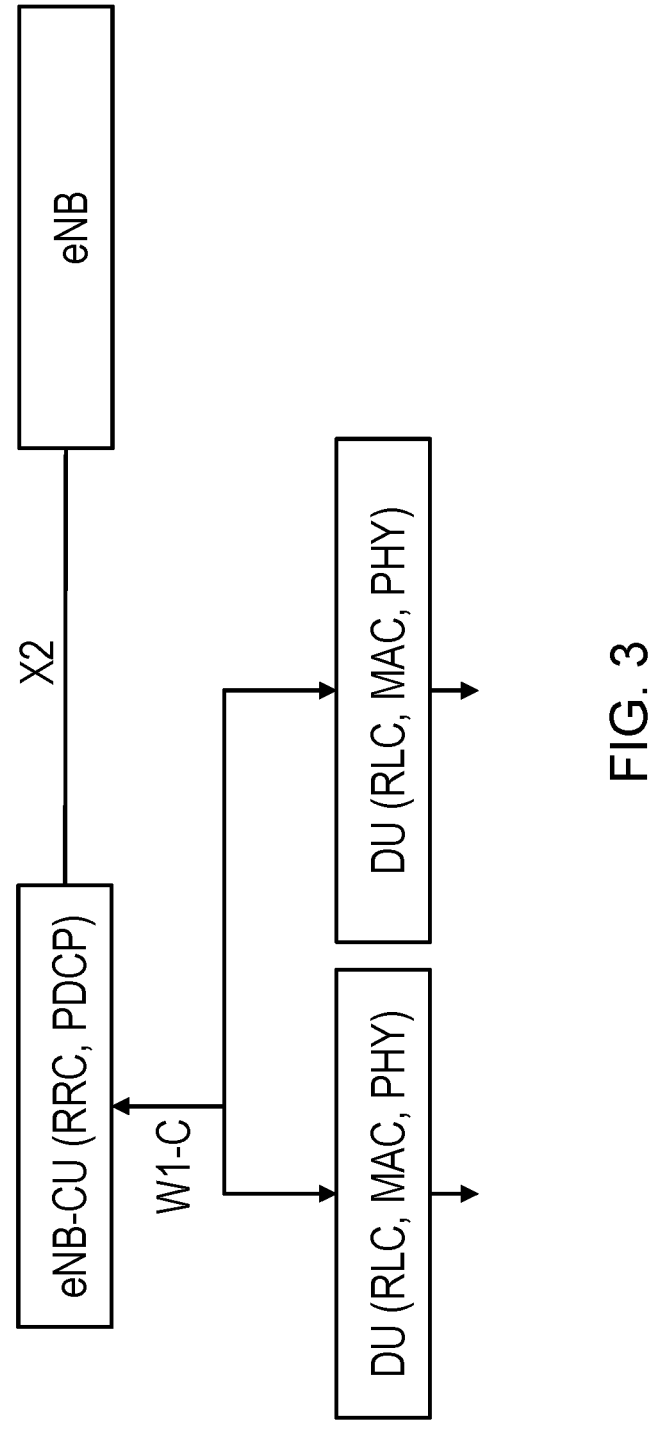
FIG. 3 shows an example of a split E-UTRAN architecture.
Figure 4:
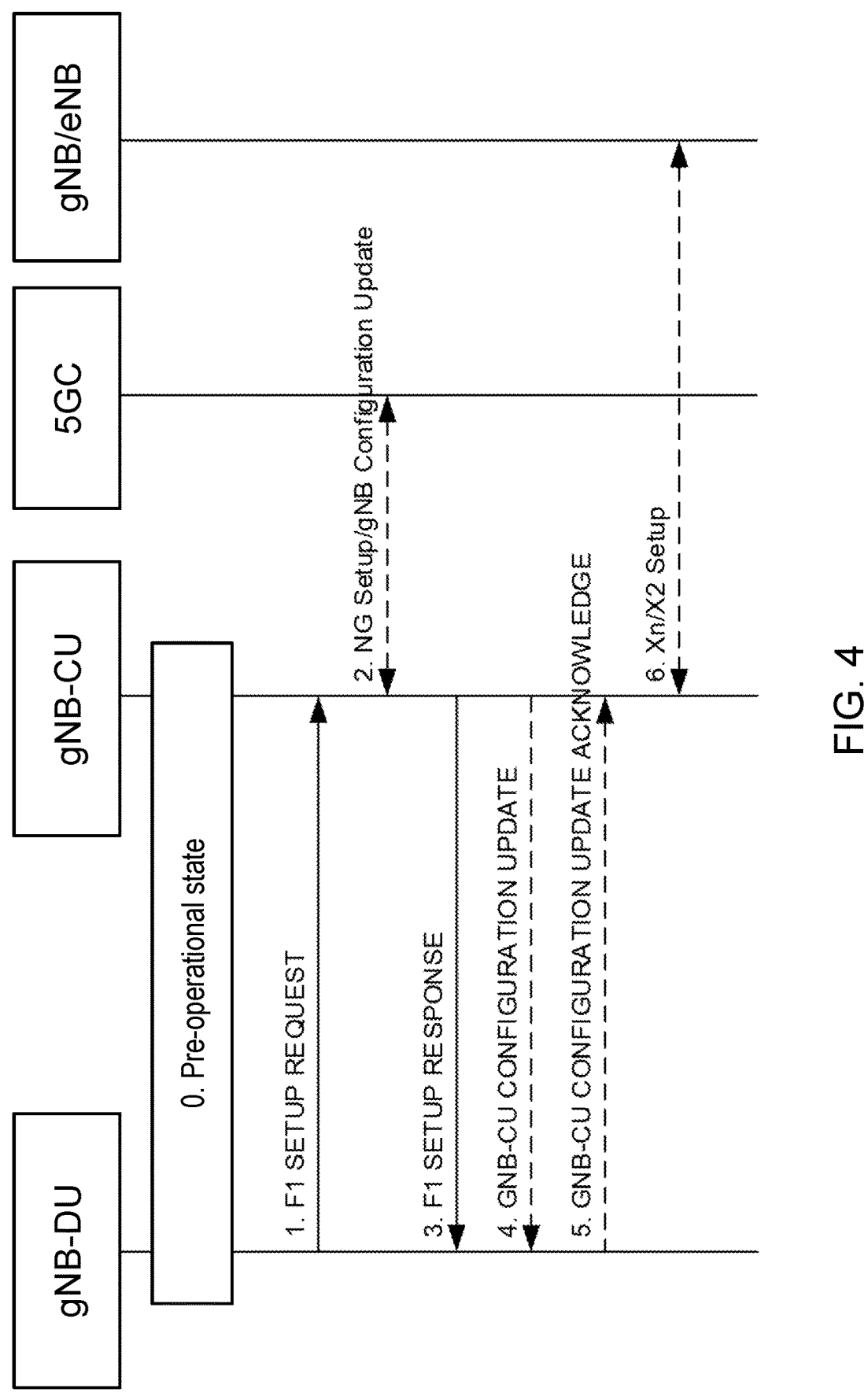
FIG. 4 shows an example of F1 interface startup and cell activation.
Figure 5:
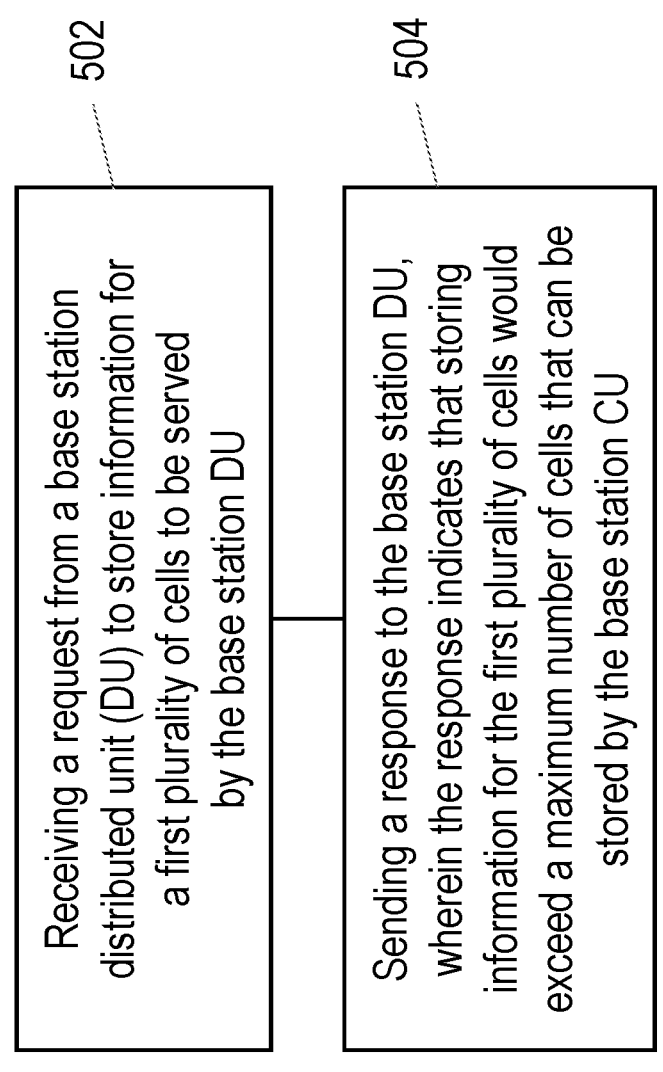
FIG. 5 is a flow chart of an example of a method performed by a base station control unit (CU) according to some embodiments.

In one example, as shown in FIG. 5, a method 500 performed by a base station control unit (CU) is provided. For example, the base station CU may be a gNB-CU, eNB-CU, gNB-CU-CP or eNB-CU-CP. The method 500 comprises, in step 502, receiving a request from a base station distributed unit (DU) to store information on a first plurality of cells to be served by the base station DU, which may be for example a gNB-DU or eNB-DU. The request may be for a request for the CU to "add" the cells to a list of cells that are available to be activated at the DU. The method 500 also comprises, in step 504, sending a response to the base station DU, wherein the response indicates that storing information on the first plurality of cells would exceed a maximum number of cells that can be stored by the base station CU.

In some examples, the response indicates that storing information for the first plurality of cells would exceed the maximum number of cells that can be stored by the base station CU by indicating a maximum number of cells for which information can be stored by the base station CU and/or by indicating a maximum number of cells that can be added to a list of cells for which information can be stored by the base station CU. Thus for example the DU can determine from the response the maximum number of cells that can be "added" at the CU.

The method may in some examples comprise, after sending the response to the base station DU, receiving a further request from the base station DU to store information for a second plurality of cells to be served by the base station DU. Thus for example the DU may revise its cells to be added in view of the information returned in the response. In some examples, the second plurality of cells comprises a subset of the first plurality of cells. The method may in some examples comprise storing the information for the second plurality of cells (but not for example the information for the first plurality of cells, which would push the number stored over the maximum for the CU). The response may in some examples indicate failure of the request to store the information for the first plurality of cells. The response may in some examples comprise a F1 SETUP FAILURE or GNB-DU CONFIGURATION UPDATE FAILURE message, and thus may for example indicate that the request to store or "add" cells has failed. In some examples, a number of cells in the first plurality of cells is larger than a number of cells in the second plurality of cells.

The method may in some examples comprise storing information for a subset of the first plurality of cells (e.g. after receiving the request), and wherein the response identifies the subset of the first plurality of cells and/or identifies cells of the first plurality of cells for which information is not stored by the base station CU. Thus for example the DU is informed on those cells that could not be added due to the maximum number being otherwise exceeded. In some examples, the number of cells stored by the CU at this point may be the maximum number (which may be for the DU and in some examples also other DUs). In some examples, the response indicates that storing information for the first plurality of cells would exceed the maximum number of cells that can be stored by the base station CU by identifying the subset of the first plurality of cells and/or identifying the cells of the first plurality of cells for which information is not stored by the base station CU. Thus for example it may be implied in the response that the number would be exceeded by adding all of the plurality of cells (though there may also be an explicit indication of this in some examples). The response may comprise for example a F1 SETUP RESPONSE or GNB-DU CONFIGURATION UPDATE ACKNOWLEDGE message. The response may include for example an instruction to the base station DU to activate the cells in the subset of the first plurality of cells.

In some examples, the base station CU is associated with the base station DU. That is, for example, the DU is connected to the CU.

Figure 6:
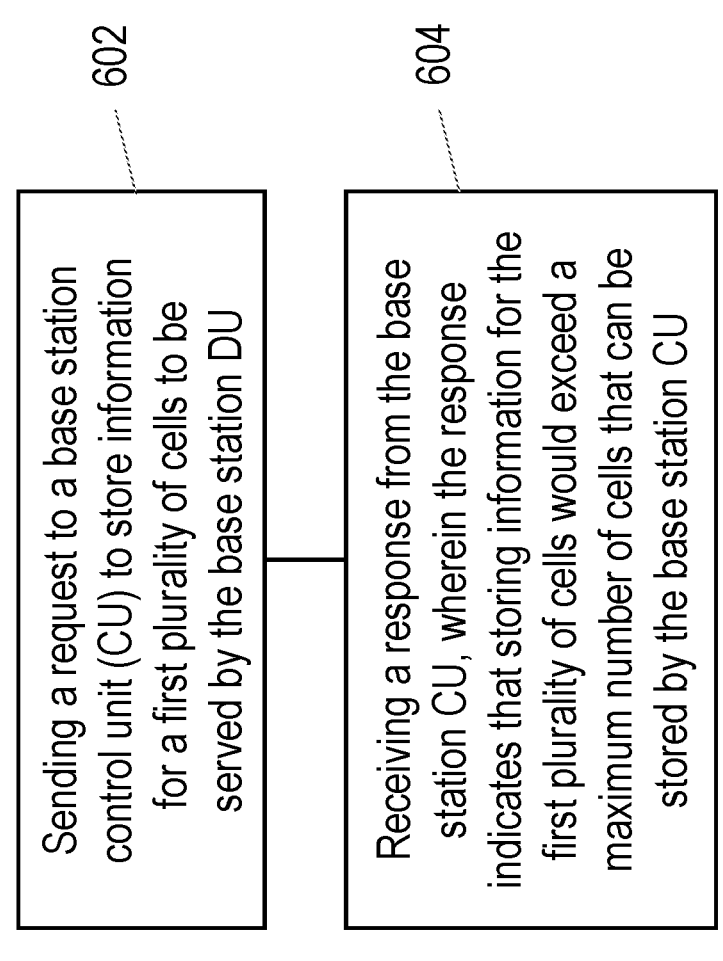
FIG. 6 is a flow chart of an example of a method performed by a base station distributed unit (DU) according to some embodiments.

In another example, shown in FIG. 6, a method 600 performed by a base station distributed unit (DU) is provided. This may be for example a method performed by the DU that is connected to a CU that performs the method described above. The DU may be for example a gNB-DU or eNB-DU. The method 600 performed by the DU comprises, in step 602, sending a request to a base station control unit (CU) to store information for a first plurality of cells to be served by the base station DU and, in step 604, receiving a response from the base station CU, wherein the response indicates that storing information for the first plurality of cells would exceed a maximum number of cells that can be stored by the base station CU. The CU may be for example a gNB-CU, gNB-CU-CP, eNB-CU or eNB-CU-CP.

In some examples, the response indicates that storing information for the first plurality of cells would exceed the maximum number of cells that can be stored by the base station CU by indicating a maximum number of cells for which information can be stored by the base station CU and/or by indicating a maximum number of cells that can be added to a list of cells for which information can be stored by the base station CU.

In some examples, the method comprises, after receiving the response from the base station CU, sending a further request to the base station CU to store information for a second plurality of cells to be served by the base station DU. The second plurality of cells comprises for example a subset of the first plurality of cells. The response may in some examples indicate failure of the request to store the information for the first plurality of cells. The response may in some examples comprise a F1 SETUP FAILURE or GNB-DU CONFIGURATION UPDATE FAILURE message. In some examples, a number of cells in the first plurality of cells is larger than a number of cells in the second plurality of cells.

In some examples, the response identifies a subset of the first plurality of cells for which information is stored by the base station CU and/or identifies cells of the first plurality of cells for which information is not stored by the base station CU. The response may in some examples indicate that storing information for the first plurality of cells would exceed the maximum number of cells that can be stored by the base station CU by identifying the subset of the first plurality of cells and/or identifying the cells of the first plurality of cells for which information is not stored by the base station CU. The response may comprise for example a F1 SETUP RESPONSE or GNB-DU CONFIGURATION UPDATE ACKNOWLEDGE message. The response may in some examples include an instruction from the base station CU to activate the cells in the subset of the first plurality of cells.

In some examples, the base station CU is associated with the base station DU.

Particular example embodiments will now be described. Such examples comprise actions for two RAN entities (e.g., gNB-DU and gNB-CU in DU/CU split architecture in NR scenario). Therefore, in these examples the 2-split architecture is taken into account, where the gNB-CU remains a single node. However a 3-split architecture is also possible, where (in the case of NR) the gNB-CU is further split into gNB-CU-CP and gNB-CU-UP. In that case, the description of these examples is still pertinent, and what is herein referred to as the gNB-CU would be replaced by the gNB-CU-CP (or equivalent nodes for other RAN technologies).

Method 1: Successful Addition of Partial List of Cells

In one example, during an F1 Setup procedure, the gNB-DU sends an F1 SETUP REQUEST message to the gNB-CU wherein a number of cells are requested to be created. This may be an example of a request from a base station DU to store information for a first plurality of cells to be served by the base station DU. The gNB-CU realizes that the number of cells exceed the maximum number of supported cells and as a result responds with an F1 SETUP RESPONSE message that includes a Cells Failed to be Added List IE, which includes the cells that the gNB-CU could not add and make ready to be activated due to having reached its maximum number of supported cells. This can be both due to exceeding the gNB-CU total limit of cells or exceeding the limit of cells allowed for a single DU. This may be an example of a response that indicates that storing information for the first plurality of cells would exceed a maximum number of cells that can be stored by the base station CU. When the gNB-DU receives the F1 SETUP RESPONSE message with the new IE it shall understand that the cells failed to be added are not available for being activated at the gNB-CU. The gNB-DU may, at a later stage, decide to signal a gNB-DU Configuration Update message to the gNB-CU indicating a list of new cells to be activated and a list of cells to be de-activated, namely the gNB-DU could adjust the overall list of cells ready to be activated by the gNB-CU.

In some examples the F1 SETUP RESPONSE message may be as follows:

9.2.1.5 F1 Setup Response

This message is sent by the gNB-CU to transfer information associated to an F1-C interface instance.

| | | | Direction: gNB-CU → gNB-DU | | | |
|---|---|---|---|---|---|---|
| IE/Group Name | Presence | Range | IE type and reference | Semantics description | Criticality | Assigned Criticality |
| Message Type | M | | 9.3.1.1 | | YES | reject |
| Transaction ID | M | | 9.3.1.23 | | YES | reject |
| gNB-CU Name | O | | Printable String(SIZE (1 . . . 150, . . . )) | Human readable name of the gNB-CU. | YES | ignore |
| Cells to be Activated List | | 0 . . . 1 | | | YES | reject |
| >Cells to be Activated List Item | | 1 . . . \<maxCellingNBDU> | | List of cells to be activated | EACH | reject |
| >> NR CGI | M | | 9.3.1.12 | | — | |
| >> NR PCI | O | | INTEGER (0 . . . 1007) | Physical Cell ID | — | |

-continued

| | | | | Direction: gNB-CU → gNB-DU | | | |
|---|---|---|---|---|---|---|---|
| IE/Group Name | Presence | Range | IE type and reference | Semantics description | Criticality | Assigned Criticality |
| >>gNB-CU System Information | O | | 9.3.1.42 | RRC container with system information owned by gNB-CU | YES | reject |
| >>Available PLMN List | O | | 9.3.1.65 | | YES | ignore |
| >>Extended Available PLMN List | O | | 9.3.1.76 | This is included if Available PLMN List IE is included and if more than 6 Available PLMNs is to be signalled. | YES | ignore |
| gNB-CU RRC version | M | | RRC version 9.3.1.70 | | YES | reject |
| Transport Layer Addresses Info | O | | Transport Layer Addresses Info 9.3.2.5 | | YES | ignore |
| Cells Failed to be Added List | | 0 . . . 1 | | | YES | reject |
| > Cells Failed to be Added List Item | | 1 . . . <maxCellingNBDU> | | | EACH | reject |
| >> NR CGI | M | | 9.3.1.12 | | — | — |

| Range bound | Explanation |
|---|---|
| maxCellingNBDU | Maximum no. cells that can be served by a gNB-DU. Value is 512. |

In another example, during a gNB-DU Configuration Update procedure the gNB-DU sends a GNB-DU CONFIGURATION UPDATE message to the gNB-CU wherein a number of cells are requested to be created. This may be an example of a request from a base station DU to store information for a first plurality of cells to be served by the base station DU. The gNB-CU realizes that the number of cells exceeds its maximum number of supported cells and as a result responds with a GNB-DU CONFIGURATION UPDATE ACKNOWLEDGE message that includes the Cells Failed to be Added List IE. This can be both due to exceeding the gNB-CU total limit of cells or exceeding the limit of cells allowed for a single DU. This may be an example of a response that indicates that storing information for the first plurality of cells would exceed a maximum number of cells that can be stored by the base station CU. When the gNB-DU receives the GNB-DU CONFIGURA- TION UPDATE ACKNOWLEDGE message with the new IE it shall understand that the cells failed to be added are not available for being activated at the gNB-CU. The gNB-DU may, at a later stage, decide to signal a gNB-DU Configuration Update message to the gNB-CU indicating a list of new cells to be activated and a list of cells to be de-activated, namely the gNB-DU could adjust the overall list of cells ready to be activated by the gNB-CU.

In an example the GNB-DU CONFIGURATION ACKNOWLEDGE message may be as follows:

9.2.1.8 GNB-DU Configuration Update Acknowledge

This message is sent by a gNB-CU to a gNB-DU to acknowledge update of information associated to an F1-C interface instance.

NOTE: If F1-C signalling transport is shared among several F1-C interface instances, this message may transfer updated information associated to several F1-C interface instances.

| | | | | Direction: gNB-CU → gNB-DU | | | |
|---|---|---|---|---|---|---|---|
| IE/Group Name | Presence | Range | IE type and reference | Semantics description | Criticality | Assigned Criticality |
| Message Type | M | | 9.3.1.1 | | YES | reject |
| Transaction ID | M | | 9.3.1.23 | | YES | reject |
| Cells to be Activated List | | 0 . . . 1 | | List of cells to be activated | YES | reject |
| >Cells to be Activated List Item | | 1 . . . <maxCellingNBDU> | | | EACH | reject |

-continued

| Direction: gNB-CU → gNB-DU | | | | | | |
|---|---|---|---|---|---|---|
| IE/Group Name | Presence | Range | IE type and reference | Semantics description | Criticality | Assigned Criticality |
| >> NR CGI | M | | 9.3.1.12 | | — | |
| >> NR PCI | O | | INTEGER (0 . . . 1007) | Physical Cell ID | — | |
| >> gNB-CU System Information | O | | 9.3.1.42 | RRC container with system information owned by gNB-CU | YES | reject |
| >>Available PLMN List | O | | 9.3.1.65 | | YES | ignore |
| >>Extended Available PLMN List | O | | 9.3.1.76 | This is included if Available PLMN List IE is included and if more than 6 Available PLMNs is to be signalled. | YES | ignore |
| Criticality Diagnostics | O | | 9.3.1.3 | | YES | ignore |
| Cells to be Deactivated List | | 0 . . . 1 | | List of cells to be deactivated | YES | reject |
| >Cells to be Deactivated List Item | | 1 . . . <maxCellingNBDU> | | | EACH | reject |
| >> NR CGI | M | | 9.3.1.12 | | — | — |
| Transport Layer Address Info | O | | 9.3.2.5 | | YES | ignore |
| Cells Failed to be Added List | | 0 . . . 1 | | | YES | reject |
| > Cells Failed to be Added List Item | | 1 . . . <maxCellingNBDU> | | | EACH | reject |
| >> NR CGI | M | | 9.3.1.12 | | — | — |
| Range bound | | Explanation | | | | |
| maxCellingNBDU | | Maximum no. cells that can be served by a gNB-DU. Value is 512. | | | | |

In some examples, it is also proposed to introduce a new cause value that can be used with any of the embodiments disclosed herein, e.g. it can be added to the F1Setup Response and gNB-DU Configuration Update Acknowledge messages. The new cause value may be for example gNB-CU Cell Capacity Exceeded, and means that the number of cells requested to setup was exceeding maximum cell capacity in the gNB-CU. This can in some examples be defined in the TS 38.473 as in the example below:

9.3.1.2 Cause

The purpose of the Cause IE is to indicate the reason for a particular event for the F1AP protocol.

| IE/Group Name | Presence | Range | IE Type and Reference | Semantics Description |
|---|---|---|---|---|
| CHOICE Cause Group >Radio Network Layer | M | | | |
| >>Radio Network | M | | ENUMERATED (Unspecified, RL failure-RLC, Unknown or already allocated gNB-CU UE F1AP ID, Unknown or already allocated gNB-DU UE F1AP ID, Unknown or inconsistent pair of UE F1AP ID, | |
| Layer Cause | | | Interaction with other procedure, Not supported QCI Value, Action Desirable for Radio Reasons, No Radio Resources Available, Procedure cancelled, Normal Release, . . . , Cell not available, RL failure-others, UE | |

-continued

| IE/Group Name | Presence | Range | IE Type and Reference | Semantics Description |
|---|---|---|---|---|
| | | | rejection, Resources not available for the slice, AMF initiated abnormal release, Release due to Pre-Emption, PLMN not served by the gNB-CU, Multiple DRB ID Instances, Unknown DRB ID, gNB-CU Cell Capacity Exceeded) | |
| >Transport Layer | | | | |
| >>Transport Layer Cause | M | | ENUMERATED (Unspecified, Transport Resource Unavailable, . . . ) | |
| >Protocol | | | | |
| >>Protocol Cause | M | | ENUMERATED (Transfer Syntax Error, Abstract Syntax Error (Reject), Abstract Syntax Error (Ignore and Notify), Message not Compatible with Receiver State, Semantic Error, Abstract Syntax Error (Falsely Constructed Message), Unspecified, . . . ) | |
| >Misc | | | | |
| >>Miscellaneous Cause | M | | ENUMERATED (Control Processing Overload, Not enough User Plane Processing Resources, Hardware Failure, O&M Intervention, Unspecified, . . . ) | |

The meaning of the different cause values is described in the following table. In general, "not supported" cause values indicate that the related capability is missing. On the other hand, "not available" cause values indicate that the related capability is present, but insufficient resources were available to perform the requested action.

| Radio Network Layer cause | Meaning |
|---|---|
| Unspecified | Sent for radio network layer cause when none of the specified cause values applies. |
| RL Failure-RLC | The action is due to an RL failure caused by exceeding the maximum number of ARQ retransmissions. |
| Unknown or already allocated gNB-CU UE F1AP ID | The action failed because the gNB-CU UE F1AP ID is either unknown, or (for a first message received at the gNB-CU) is known and already allocated to an existing context. |
| Unknown or already allocated gNB-DU UE F1AP ID | The action failed because the gNB-DU UE F1AP ID is either unknown, or (for a first message received at the gNB-DU) is known and already allocated to an existing context. |
| Unknown or inconsistent pair of UE F1AP ID | The action failed because both UE F1AP IDs are unknown, or are known but do not define a single UE context. |
| Interaction with other procedure | The action is due to an ongoing interaction with another procedure. |
| Not supported QCI Value | The action failed because the requested QCI is not supported. |
| Action Desirable for Radio Reasons | The reason for requesting the action is radio related. |
| No Radio Resources Available | The cell(s) in the requested node don't have sufficient radio resources available. |
| Procedure cancelled | The sending node cancelled the procedure due to other urgent actions to be performed. |
| Normal Release | The action is due to a normal release of the UE (e.g. because of mobility) and does not indicate an error. |
| Cell Not Available | The action failed due to no cell available in the requested node. |
| RL Failure-others | The action is due to an RL failure caused by other radio link failures than exceeding the maximum number of ARQ retransmissions. |

-continued

| | |
|---|---|
| UE rejection | The action is due to gNB-CU's rejection of a UE access request. |
| Resources not available for the slice | The requested resources are not available for the slice. |
| AMF initiated abnormal release | The release is triggered by an error in the AMF or in the NAS layer. |
| Release due to Pre-Emption | Release is initiated due to pre-emption. |
| PLMN not served by the gNB-CU | The PLMN indicated by the UE is not served by the gNB-CU. |
| Multiple DRB ID Instances | The action failed because multiple instances of the same DRB had been provided. |
| Unknown DRB ID | The action failed because the DRB ID is unknow. |
| gNB-CU Cell Capacity Exceeded | The number of cells requested to be added was exceeding maximum cell capacity in the gNB-CU. |

| Transport Layer cause | Meaning |
|---|---|
| Unspecified | Sent when none of the above cause values applies but still the cause is Transport Network Layer related. |
| Transport Resource Unavailable | The required transport resources are not available. |

| Protocol cause | Meaning |
|---|---|
| Transfer Syntax Error | The received message included a transfer syntax error. |
| Abstract Syntax Error (Reject) | The received message included an abstract syntax error and the concerning criticality indicated "reject". |
| Abstract Syntax Error (Ignore And Notify) | The received message included an abstract syntax error and the concerning criticality indicated "ignore and notify". |
| Message Not Compatible With Receiver State | The received message was not compatible with the receiver state. |
| Semantic Error | The received message included a semantic error. |
| Abstract Syntax Error (Falsely Constructed Message) | The received message contained IEs or IE groups in wrong order or with too many occurrences. |
| Unspecified | Sent when none of the above cause values applies but still the cause is Protocol related. |

| Miscellaneous cause | Meaning |
|---|---|
| Control Processing Overload | Control processing overload. |
| Not Enough User Plane Processing Resources Available | No enough resources are available related to user plane processing. |
| Hardware Failure | Action related to hardware failure. |
| O&M Intervention | The action is due to O&M intervention. |
| Unspecified Failure | Sent when none of the above cause values applies and the cause is not related to any of the categories Radio Network Layer, Transport Network Layer or Protocol. |

Method 2: Procedure Failure with Indication of Failure Reasons

In a particular example, during an F1 Setup procedure the gNB-DU sends an F1 SETUP REQUEST message to the gNB-CU wherein a number of cells are requested to be created. This may be an example of a request from a base station distributed unit (DU) to store information for a first plurality of cells to be served by the base station DU. The gNB-CU realizes that the number of cells exceed the maximum number of supported cells and as a result responds with an F1 SETUP FAILURE message that includes the Number of available cells IE. This may be an example of a response that indicates that storing information for the first plurality of cells would exceed a maximum number of cells that can be stored by the base station CU. When the gNB-DU receives the F1 SETUP FAILURE message with the new IE it shall understand that the number of cells requested to setup was exceeding the gNB-CU limit. This can be both due to exceeding the gNB-CU total limit of cells or exceeding the limit of cell allowed for a single DU (that is maxCellingNBDU). There is no change in current behaviour so at a failed procedure, no cell is added to the gNB-CU or other included data changed in the gNB-CU.

In some examples the F1 SETUP FAILURE message may be as follows:

9.2.1.6 F1 Setup Failure

This message is sent by the gNB-CU to indicate F1 Setup failure.

| | | | Direction: gNB-CU → gNB-DU | | | |
|---|---|---|---|---|---|---|
| IE/Group Name | Presence | Range | IE type and reference | Semantics description | Criticality | Assigned Criticality |
| Message Type | M | | 9.3.1.1 | | YES | reject |
| Transaction ID | M | | 9.3.1.23 | | YES | reject |
| Cause | M | | 9.3.1.2 | | YES | ignore |
| Time to wait | O | | 9.3.1.13 | | YES | ignore |
| Criticality Diagnostics | O | | 9.3.1.3 | | YES | ignore |
| Additional Number Of Cells Possible To Add | O | | INTEGER (0 . . . maxCellingNBDU-1) | | YES | ignore |
| Range bound | | Explanation | | | | |
| maxCellingNBDU | | Maximum no. cells that can be served by a gNB-DU. Value is 512. | | | | |

In another example, during a gNB-DU Configuration Update procedure the gNB-DU sends a GNB-DU CONFIGURATION UPDATE message to the gNB-CU wherein a number of cells are requested to be created. This may be an example of a request from a base station distributed unit (DU) to store information for a first plurality of cells to be served by the base station DU. The gNB-CU realizes that the number of cells exceed the maximum number of supported cells and as a result responds with a GNB-DU CONFIGURATION UPDATE FAILURE message that includes the Number of available cells IE. This may be an example of a response that indicates that storing information for the first plurality of cells would exceed a maximum number of cells that can be stored by the base station CU. When the gNB-DU receives the GNB-DU CONFIGURATION UPDATE FAILURE message with the new IE it shall understand that the number of cells requested to setup was exceeding the gNB-CU limit. This can be both due to exceeding the gNB-CU total limit of cells or exceeding the limit of cell allowed for a single DU (that is maxCelling-NBDU). There is no change in current behaviour so at a failed procedure, no cell is added to the gNB-CU or other included data changed in the gNB-CU.

In some examples the GNB-DU CONFIGURATION UPDATE FAILURE message may be as follows:
9.2.1.9 GNB-DU Configuration Update Failure
This message is sent by the gNB-CU to indicate gNB-DU Configuration Update failure.

| | | | Direction: gNB-CU → gNB-DU | | | |
|---|---|---|---|---|---|---|
| IE/Group Name | Presence | Range | IE type and reference | Semantics description | Criticality | Assigned Criticality |
| Message Type | M | | 9.3.1.1 | | YES | reject |
| Transaction ID | M | | 9.3.1.23 | | YES | reject |
| Cause | M | | 9.3.1.2 | | YES | ignore |
| Time to wait | O | | 9.3.1.13 | | YES | ignore |
| Criticality Diagnostics | O | | 9.3.1.3 | | YES | ignore |
| Additional Number Of Cells Possible To Add | O | | INTEGER (0 . . . maxCellingNBDU-1) | | YES | ignore |
| Range bound | | Explanation | | | | |
| maxCellingNBDU | | Maximum no. cells that can be served by a gNB-DU. Value is 512. | | | | |

It is also proposed to introduce in some examples a new cause value that can be used in any embodiment of this disclosure. The new cause value may for example be gNB-CU Cell Capacity Exceeded, and means that the number of cells requested to setup was exceeding maximum cell capacity in the gNB-CU. This can be defined in some examples in TS 38.473, for example as below:

9.3.1.2 Cause

The purpose of the Cause IE is to indicate the reason for a particular event for the F1AP protocol.

| IE/Group Name | Presence | Range | IE Type and Reference | Semantics Description |
|---|---|---|---|---|
| CHOICE Cause Group | M | | | |
| >Radio Network Layer | | | | |
| >>Radio Network Layer Cause | M | | ENUMERATED (Unspecified, RL failure-RLC, Unknown or already allocated gNB-CU UE F1AP ID, Unknown or already allocated gNB-DU UE F1AP ID, Unknown or inconsistent pair of UE F1AP ID, Interaction with other procedure, Not supported QCI Value, Action Desirable for Radio Reasons, No Radio Resources Available, Procedure cancelled, Normal Release, . . . , Cell not available, RL failure-others, UE rejection, Resources not available for the slice, AMF initiated abnormal release, Release due to Pre-Emption, PLMN not served by the gNB-CU, Multiple DRB ID Instances, Unknown DRB ID, gNB-CU Cell Capacity Exceeded) | |
| >Transport Layer | | | | |
| >>Transport Layer Cause | M | | ENUMERATED (Unspecified, Transport Resource Unavailable, . . . ) | |
| >Protocol | | | | |
| >>Protocol Cause | M | | ENUMERATED (Transfer Syntax Error, Abstract Syntax Error (Reject), Abstract Syntax Error (Ignore and Notify), Message not Compatible with Receiver State, Semantic Error, Abstract Syntax Error (Falsely Constructed Message), Unspecified, . . . ) | |
| >Misc | | | | |
| >>Miscellaneous Cause | M | | ENUMERATED (Control Processing Overload, Not enough User Plane Processing Resources, Hardware Failure, O&M Intervention, Unspecified, . . . ) | |

The meaning of the different cause values is described in the following table. In general, "not supported" cause values indicate that the related capability is missing. On the other hand, "not available" cause values indicate that the related capability is present, but insufficient resources were available to perform the requested action.

| Radio Network Layer cause | Meaning |
| --- | --- |
| Unspecified | Sent for radio network layer cause when none of the specified cause values applies. |
| RL Failure-RLC | The action is due to an RL failure caused by exceeding the maximum number of ARQ retransmissions. |
| Unknown or already allocated gNB-CU UE F1AP ID | The action failed because the gNB-CU UE F1AP ID is either unknown, or (for a first message received at the gNB-CU) is known and already allocated to an existing context. |
| Unknown or already allocated gNB-DU UE F1AP ID | The action failed because the gNB-DU UE F1AP ID is either unknown, or (for a first message received at the gNB-DU) is known and already allocated to an existing context. |
| Unknown or inconsistent pair of UE F1AP ID | The action failed because both UE F1AP IDs are unknown, or are known but do not define a single UE context. |
| Interaction with other procedure | The action is due to an ongoing interaction with another procedure. |
| Not supported QCI Value | The action failed because the requested QCI is not supported. |
| Action Desirable for Radio Reasons | The reason for requesting the action is radio related. |
| No Radio Resources Available | The cell(s) in the requested node don't have sufficient radio resources available. |
| Procedure cancelled | The sending node cancelled the procedure due to other urgent actions to be performed. |
| Normal Release | The action is due to a normal release of the UE (e.g. because of mobility) and does not indicate an error. |
| Cell Not Available | The action failed due to no cell available in the requested node. |
| RL Failure-others | The action is due to an RL failure caused by other radio link failures than exceeding the maximum number of ARQ retransmissions. |
| UE rejection | The action is due to gNB-CU's rejection of a UE access request. |
| Resources not available for the slice | The requested resources are not available for the slice. |
| AMF initiated abnormal release | The release is triggered by an error in the AMF or in the NAS layer. |
| Release due to Pre-Emption | Release is initiated due to pre-emption. |
| PLMN not served by the gNB-CU | The PLMN indicated by the UE is not served by the gNB-CU. |
| Multiple DRB ID Instances | The action failed because multiple instances of the same DRB had been provided. |
| Unknown DRB ID | The action failed because the DRB ID is unknow. |
| gNB-CU Cell Capacity Exceeded | The number of cells requested to be added was exceeding maximum cell capacity in the gNB-CU. |

| Transport Layer cause | Meaning |
| --- | --- |
| Unspecified | Sent when none of the above cause values applies but still the cause is Transport Network Layer related. |
| Transport Resource Unavailable | The required transport resources are not available. |

| Protocol cause | Meaning |
| --- | --- |
| Transfer Syntax Error | The received message included a transfer syntax error. |
| Abstract Syntax Error (Reject) | The received message included an abstract syntax error and the concerning criticality indicated "reject". |
| Abstract Syntax Error (Ignore And Notify) | The received message included an abstract syntax error and the concerning criticality indicated "ignore and notify". |
| Message Not Compatible With Receiver State | The received message was not compatible with the receiver state. |
| Semantic Error | The received message included a semantic error. |
| Abstract Syntax Error (Falsely | The received message contained IEs or IE groups |

-continued

| Constructed Message) | in wrong order or with too many occurrences. |
| Unspecified | Sent when none of the above cause values applies but still the cause is Protocol related. |

| Miscellaneous cause | Meaning |
| --- | --- |
| Control Processing Overload | Control processing overload. |
| Not Enough User Plane Processing Resources Available | No enough resources are available related to user plane processing. |
| Hardware Failure | Action related to hardware failure. |
| O&M Intervention | The action is due to O&M intervention. |
| Unspecified Failure | Sent when none of the above cause values applies and the cause is not related to any of the categories Radio Network Layer, Transport Network Layer or Protocol. |

Figure 7:
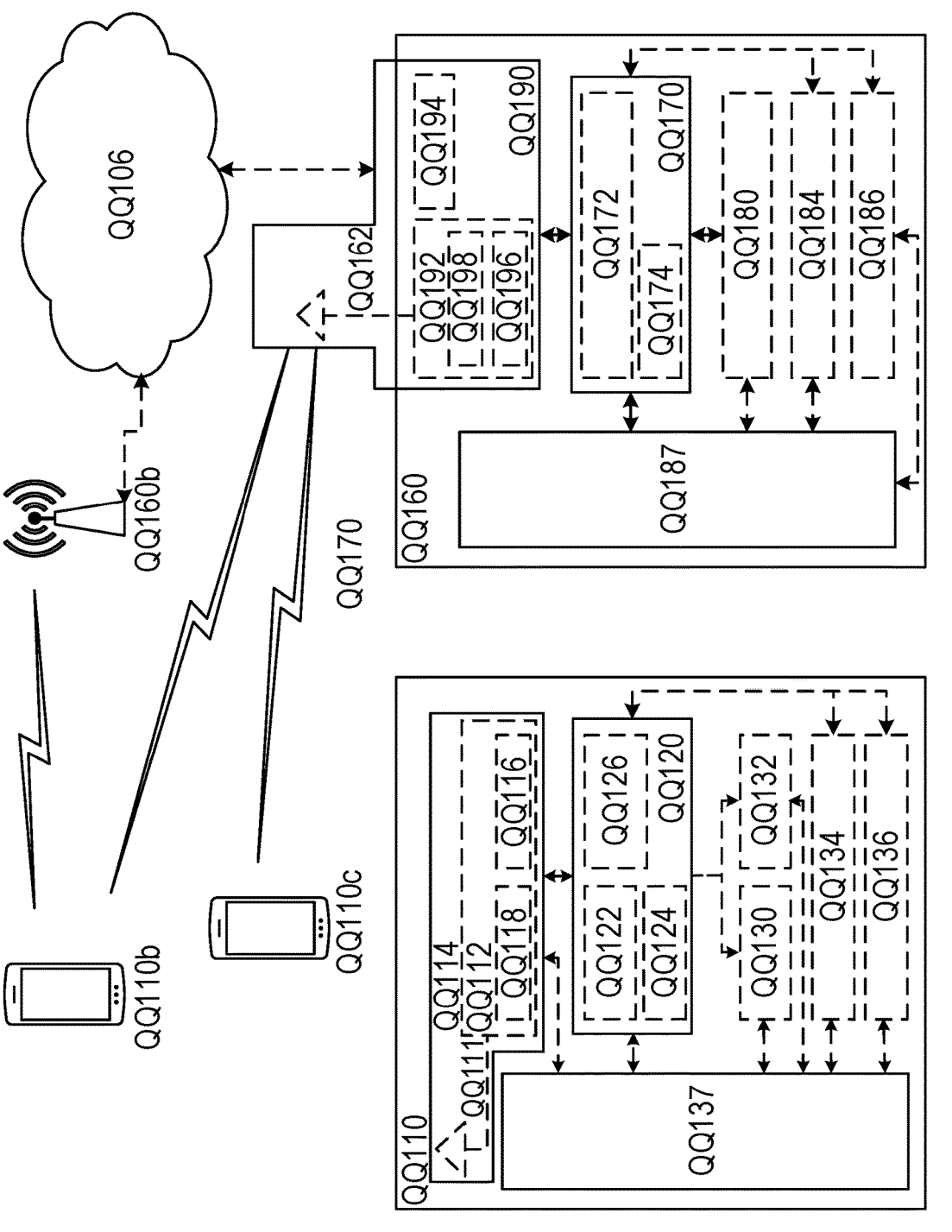
FIG. 7 shows an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 7 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD- DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 8, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
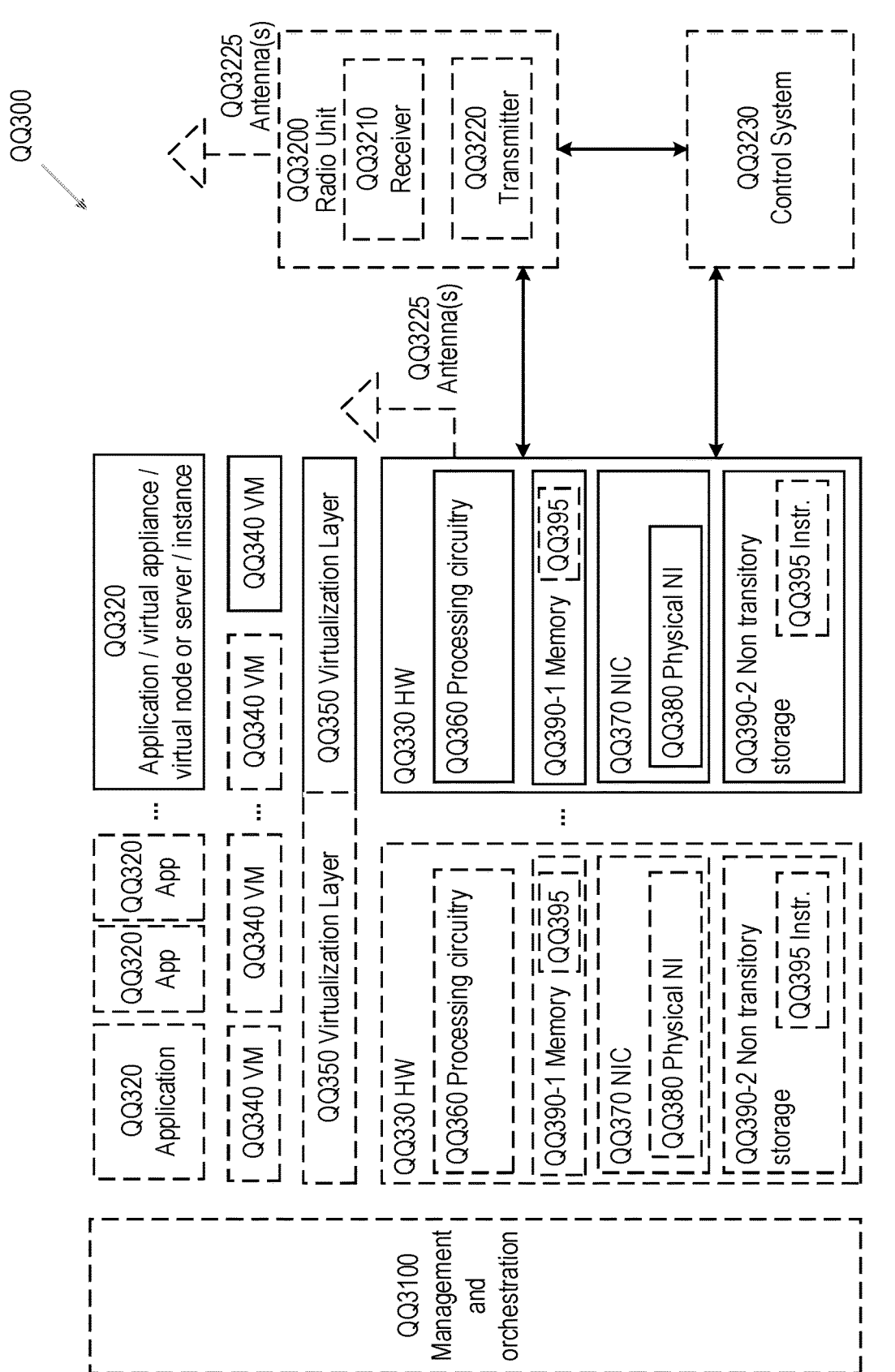
FIG. 9 shows an example of a virtualization environment in accordance with some embodiments.

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 9, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 10:
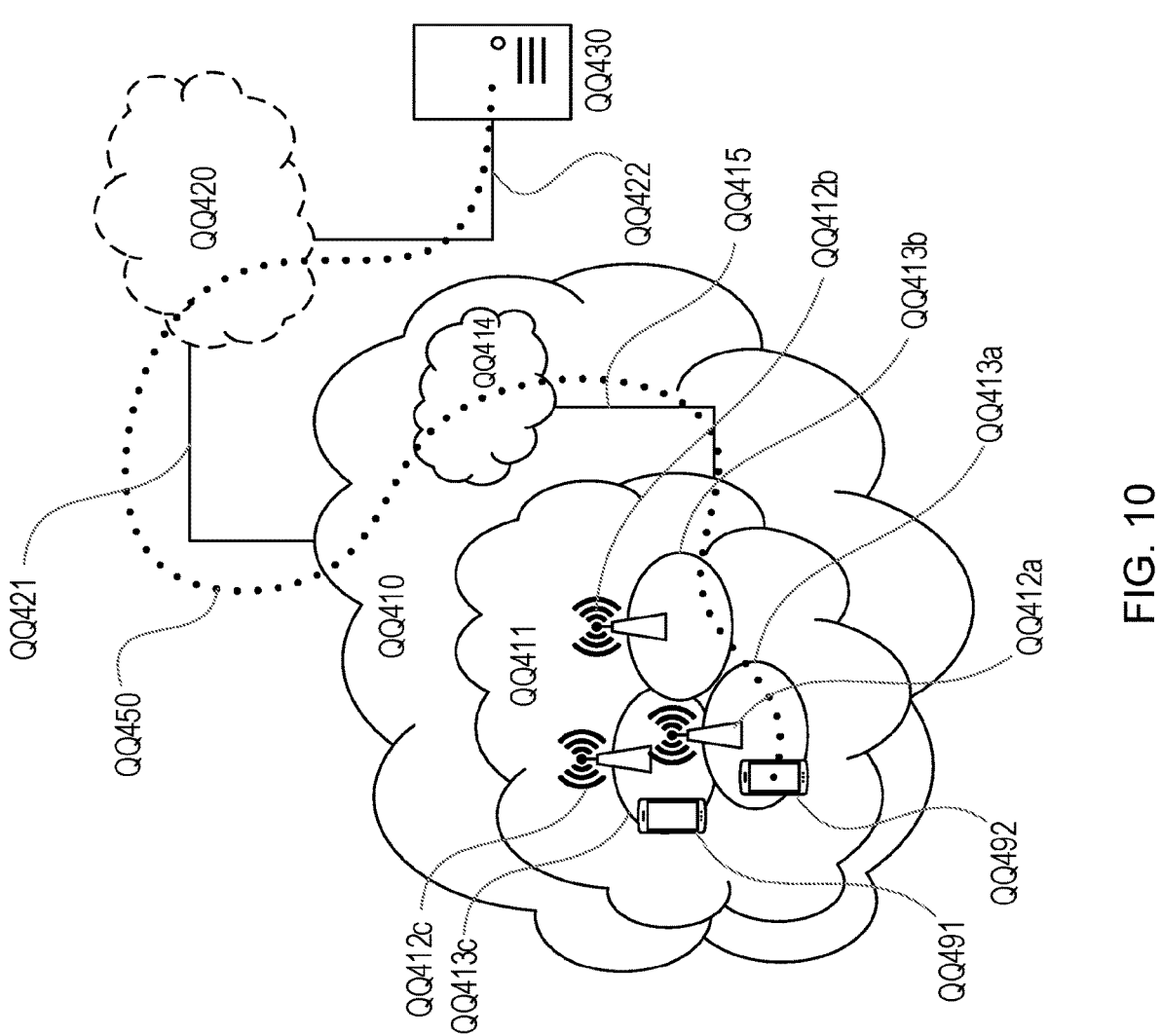
FIG. 10 shows an example of a telecommunication network connected via an intermediate network to a host computer in accordance with some embodiments.

With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 11:
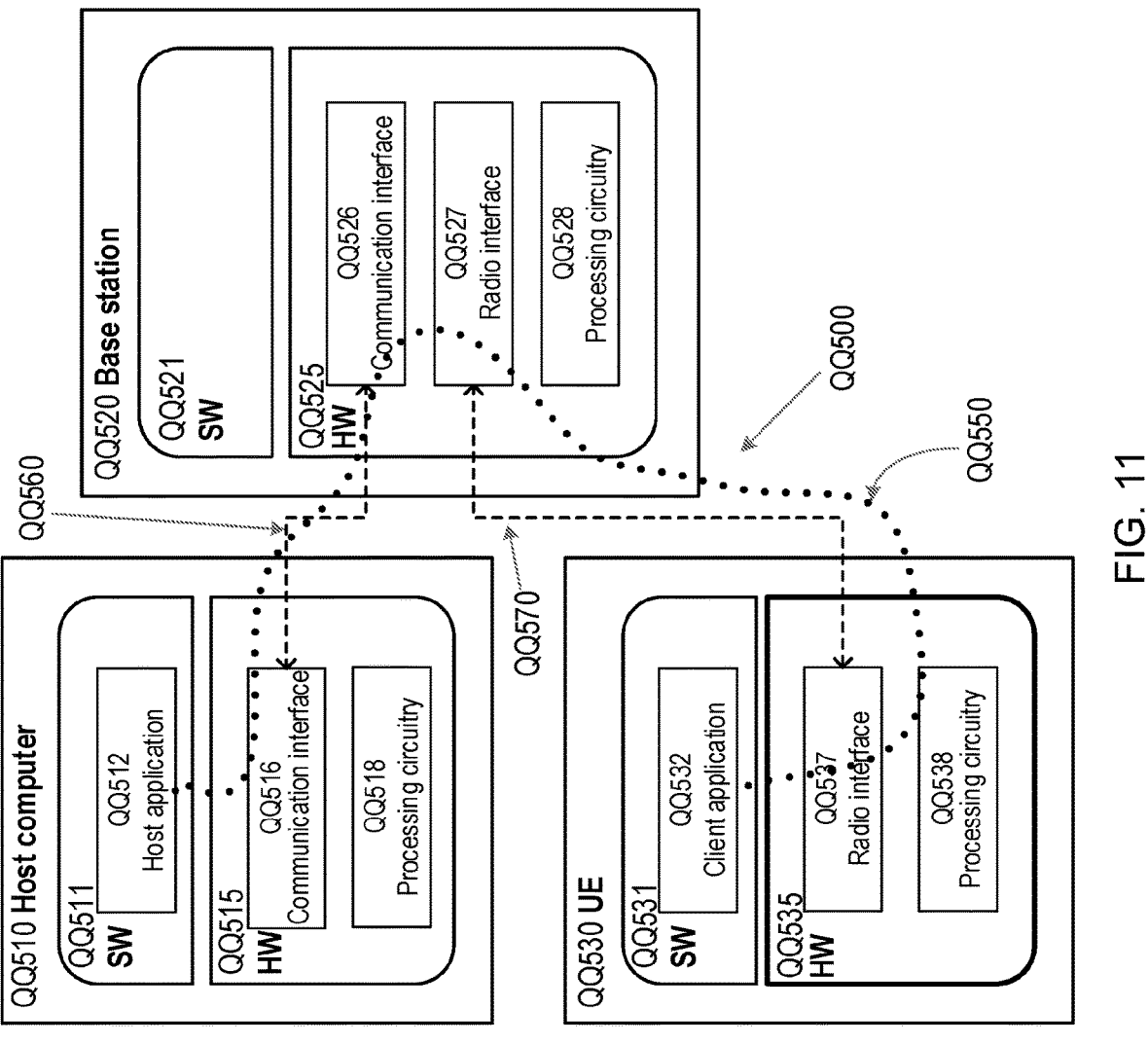
FIG. 11 shows an example of a host computer communicating via a base station with a user equipment over a partially wireless connection in accordance with some embodiments.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve network management and thereby provide benefits such as improved connectivity etc.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
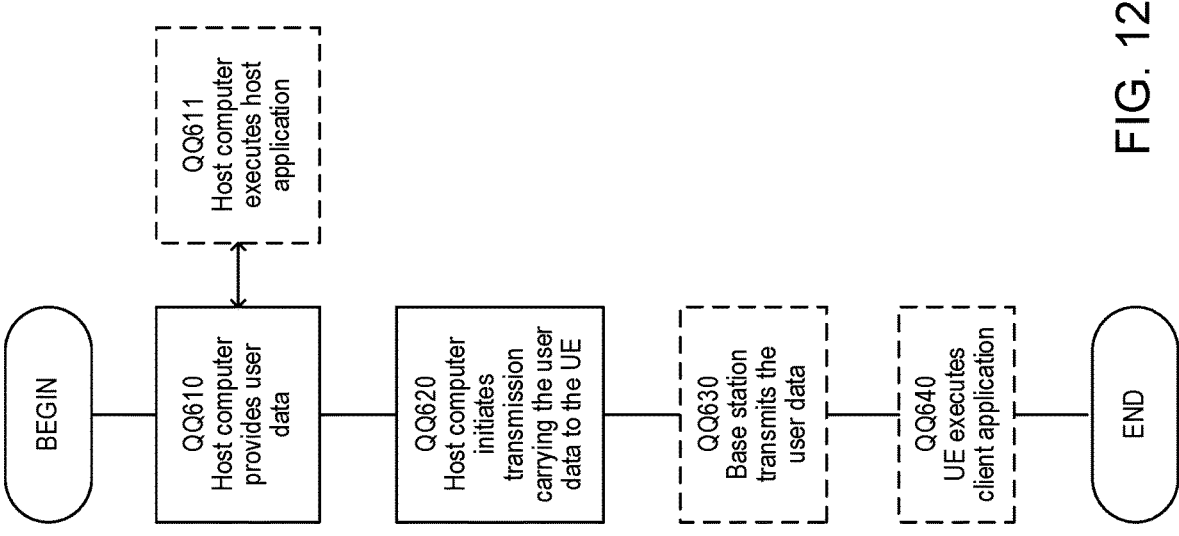
FIG. 12 shows examples of methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
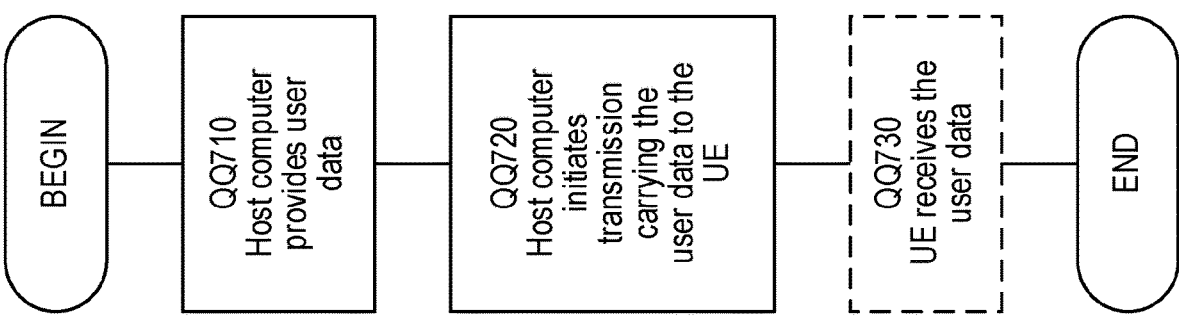
FIG. 13 shows examples of methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 14:
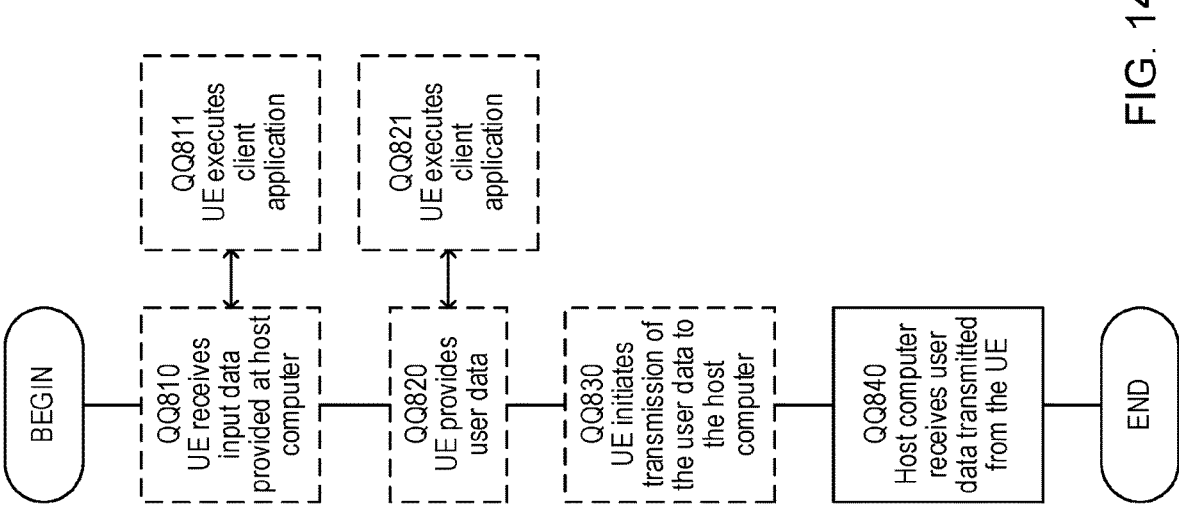
FIG. 14 shows examples of methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 15:
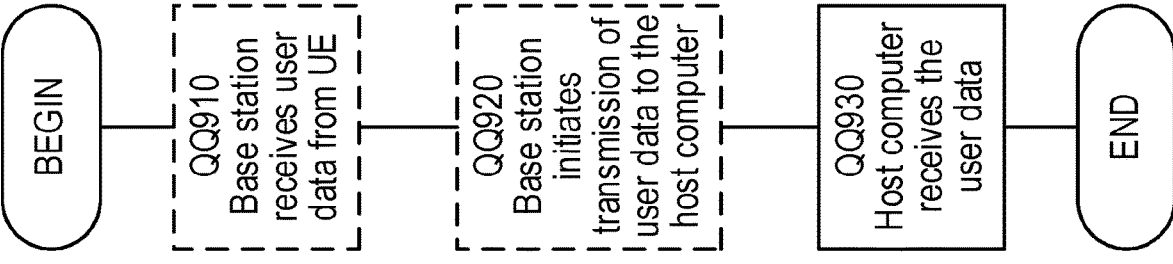
FIG. 15 shows examples of methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Figure 16:
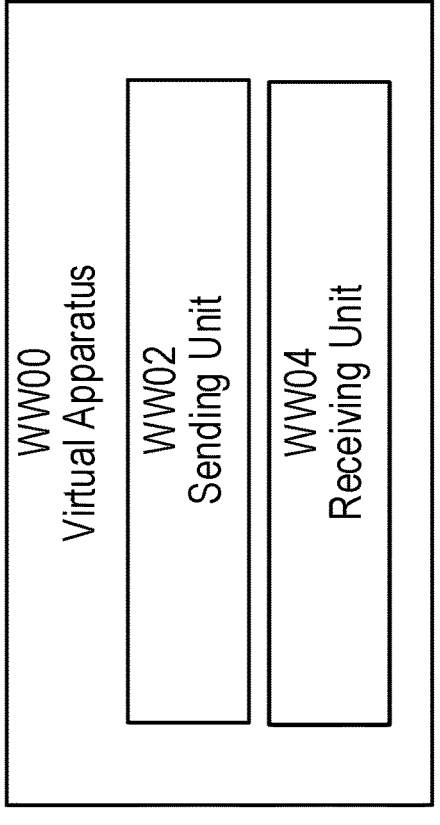
FIG. 16 shows an example of virtualization apparatus in accordance with some embodiments.

FIG. 16 illustrates a schematic block diagram of an apparatus WW00 in a wireless network (for example, the wireless network shown in FIG. 7). The apparatus may be implemented in a wireless device or network node (e.g., wireless device QQ110 or network node QQ160 shown in FIG. 7). Apparatus WW00 is operable to carry out the example method 500 described with reference to FIG. 5 and possibly any other processes or methods disclosed herein. It is also to be understood that the method of FIG. 5 is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit WW02, sending unit WW04, and any other suitable units of apparatus WW00 to perform corresponding functions according one or more embodiments of the present disclosure.

As illustrated in FIG. 16, apparatus WW00 includes receiving unit WW02 configured to receive a request from a base station distributed unit (DU) to store information for a first plurality of cells to be served by the base station DU, and sending unit WW04 configured to send a response to the base station DU, wherein the response indicates that storing information for the first plurality of cells would exceed a maximum number of cells that can be stored by the base station CU.

Figure 17:
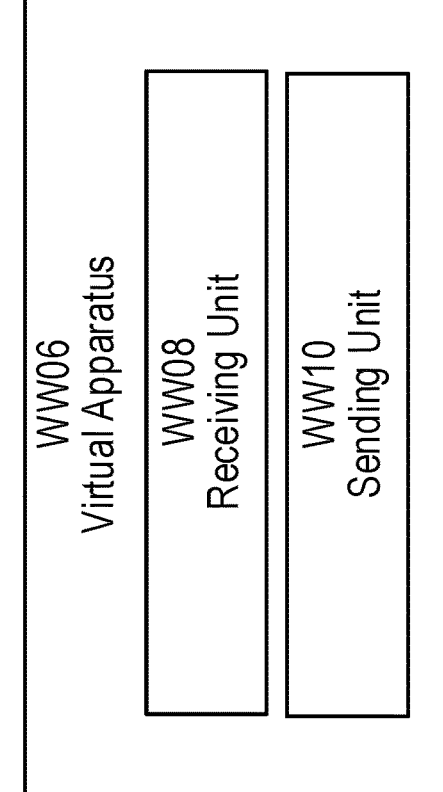
FIG. 17 shows another example of virtualization apparatus in accordance with some embodiments.

FIG. 17 illustrates a schematic block diagram of an apparatus WW06 in a wireless network (for example, the wireless network shown in FIG. 7). The apparatus may be implemented in a wireless device or network node (e.g., wireless device QQ110 or network node QQ160 shown in FIG. 7). Apparatus WW06 is operable to carry out the example method 600 described with reference to FIG. 6 and possibly any other processes or methods disclosed herein. It is also to be understood that the method of FIG. 6 is not necessarily carried out solely by apparatus WW06. At least some operations of the method can be performed by one or more other entities.

Virtual Apparatus WW06 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending unit WW08, receiving unit WW10, and any other suitable units of apparatus WW06 to perform corresponding functions according one or more embodiments of the present disclosure8

As illustrated in FIG. 17, apparatus WW06 includes sending unit WW02 configured to send a request to a base station control unit (CU) to store information for a first plurality of cells to be served by the base station DU, and receiving unit WW10 configured to receive a response from the base station CU, wherein the response indicates that storing information for the first plurality of cells would exceed a maximum number of cells that can be stored by the base station CU.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control MBMS Multimedia Broadcast Multicast Services MBSFN Multimedia Broadcast multicast service Single Frequency Network MBSFN ABS MBSFN Almost Blank Subframe MDT Minimization of Drive Tests MIB Master Information Block MME Mobility Management Entity MSC Mobile Switching Center NPDCCH Narrowband Physical Downlink Control Channel NR New Radio OCNG OFDMA Channel Noise Generator OFDM Orthogonal Frequency Division Multiplexing OFDMA Orthogonal Frequency Division Multiple Access OSS Operations Support System OTDOA Observed Time Difference of Arrival O&M Operation and Maintenance PBCH Physical Broadcast Channel P-CCPCH Primary Common Control Physical Channel PCell Primary Cell PCFICH Physical Control Format Indicator Channel PDCCH Physical Downlink Control Channel PDP Profile Delay Profile PDSCH Physical Downlink Shared Channel PGW Packet Gateway PHICH Physical Hybrid-ARQ Indicator Channel PLMN Public Land Mobile Network PMI Precoder Matrix Indicator PRACH Physical Random Access Channel PRS Positioning Reference Signal PSS Primary Synchronization Signal PUCCH Physical Uplink Control Channel PUSCH Physical Uplink Shared Channel RACH Random Access Channel QAM Quadrature Amplitude Modulation RAN Radio Access Network RAT Radio Access Technology RLM Radio Link Management RNC Radio Network Controller RNTI Radio Network Temporary Identifier RRC Radio Resource Control RRM Radio Resource Management RS Reference Signal RSCP Received Signal Code Power RSRP Reference Symbol Received Power OR Reference Signal Received Power RSRQ Reference Signal Received Quality OR Reference Symbol Received Quality RSSI Received Signal Strength Indicator RSTD Reference Signal Time Difference SCH Synchronization Channel SCell Secondary Cell SDU Service Data Unit SFN System Frame Number SGW Serving Gateway SI System Information SIB System Information Block SNR Signal to Noise Ratio SON Self Optimized Network SS Synchronization Signal SSS Secondary Synchronization Signal TDD Time Division Duplex TDOA Time Difference of Arrival TOA Time of Arrival TSS Tertiary Synchronization Signal TTI Transmission Time Interval UE User Equipment UL Uplink UMTS Universal Mobile Telecommunication System USIM Universal Subscriber Identity Module UTDOA Uplink Time Difference of Arrival UTRA Universal Terrestrial Radio Access UTRAN Universal Terrestrial Radio Access Network WCDMA Wide CDMA WLAN Wide Local Area Network

The invention claimed is:

1. A method performed by a base station control unit (CU), the method comprising:

receiving a request from a base station distributed unit (DU) to store information for a first plurality of cells to be served by the base station DU; and sending a response to the base station DU, wherein the response indicates that storing information for the first plurality of cells would exceed a maximum number of cells that can be stored by the base station CU.

2. The method of claim 1, wherein the response indicates that storing information for the first plurality of cells would exceed the maximum number of cells that can be stored by the base station CU by indicating a maximum number of cells for which information can be stored by the base station CU and/or by indicating a maximum number of cells that can be added to a list of cells for which information can be stored by the base station CU.

3. The method of claim 1, comprising, after sending the response to the base station DU, receiving a further request from the base station DU to store information for a second plurality of cells to be served by the base station DU, wherein the second plurality of cells comprises a subset of the first plurality of cells, and storing the information for the second plurality of cells.

4. The method of claim 3, wherein the response indicates failure of the request to store the information for the first plurality of cells.

5. The method of claim 4, wherein the response comprises a F1 SETUP FAILURE or GNB-DU CONFIGURATION UPDATE FAILURE message.

6. The method of claim 1, comprising storing information for a subset of the first plurality of cells, and wherein the response identifies the subset of the first plurality of cells and/or identifies cells of the first plurality of cells for which information is not stored by the base station CU.

7. The method of claim 6, wherein the response includes an instruction to the base station DU to activate the cells in the subset of the first plurality of cells.

8. A method performed by a base station distributed unit (DU), the method comprising:

sending a request to a base station control unit (CU) to store information for a first plurality of cells to be served by the base station DU; and receiving a response from the base station CU, wherein the response indicates that storing information for the first plurality of cells would exceed a maximum number of cells that can be stored by the base station CU.

9. The method of claim 8, wherein the response indicates that storing information for the first plurality of cells would exceed the maximum number of cells that can be stored by the base station CU by indicating a maximum number of cells for which information can be stored by the base station CU and/or by indicating a maximum number of cells that can be added to a list of cells for which information can be stored by the base station CU.

10. The method of claim 9, comprising, after receiving the response from the base station CU, sending a further request to the base station CU to store information for a second plurality of cells to be served by the base station DU, wherein the second plurality of cells comprises a subset of the first plurality of cells.

11. The method of claim 10, wherein the response indicates failure of the request to store the information for the first plurality of cells.

12. The method of claim 8, wherein the response identifies a subset of the first plurality of cells for which information is stored by the base station CU and/or identifies cells of the first plurality of cells for which information is not stored by the base station CU.

13. The method of claim 12, wherein the response comprises a F1 SETUP RESPONSE or GNB-DU CONFIGURATION UPDATE ACKNOWLEDGE message.

14. The method of claim 12, wherein the response includes an instruction from the base station CU to activate the cells in the subset of the first plurality of cells.

15. An apparatus in a base station control unit (CU), the apparatus comprising a processor and a memory, the memory containing instructions executable by the processor such that the apparatus is operable to:

receive a request from a base station distributed unit (DU) to store information for a first plurality of cells to be served by the base station DU; and send a response to the base station DU, wherein the response indicates that storing information for the first plurality of cells would exceed a maximum number of cells that can be stored by the base station CU.

16. The apparatus of claim 15, wherein the response indicates that storing information for the first plurality of cells would exceed the maximum number of cells that can be stored by the base station CU by indicating a maximum number of cells for which information can be stored by the base station CU and/or by indicating a maximum number of cells that can be added to a list of cells for which information can be stored by the base station CU.

17. The apparatus of claim 16, wherein the memory further contains instructions to, after sending the response to the base station DU, receive a further request from the base station DU to store information for a second plurality of cells to be served by the base station DU, wherein the second plurality of cells comprises a subset of the first plurality of cells, and storing the information for the second plurality of cells.

18. The apparatus of claim 15, wherein the memory further contains instructions to store information for a subset of the first plurality of cells, and wherein the response identifies the subset of the first plurality of cells and/or identifies cells of the first plurality of cells for which information is not stored by the base station CU.

19. The apparatus of claim 18, wherein the response includes an instruction to the base station DU to activate the cells in the subset of the first plurality of cells.

20. An apparatus in a base station distributed unit (DU), the apparatus comprising a processor and a memory, the memory containing instructions executable by the processor such that the apparatus is operable to:

send a request to a base station control unit (CU) to store information for a first plurality of cells to be served by the base station DU; and receive a response from the base station CU, wherein the response indicates that storing information for the first plurality of cells would exceed a maximum number of cells that can be stored by the base station CU.

21. The apparatus of claim 20, wherein the response indicates that storing information for the first plurality of cells would exceed the maximum number of cells that can be stored by the base station CU by indicating a maximum number of cells for which information can be stored by the base station CU and/or by indicating a maximum number of cells that can be added to a list of cells for which information can be stored by the base station CU.

22. The apparatus of claim 21, wherein the memory further contains instructions to, after receiving the response from the base station CU, send a further request to the base station CU to store information for a second plurality of cells to be served by the base station DU, wherein the second plurality of cells comprises a subset of the first plurality of cells.

23. The apparatus of claim 20, wherein the response identifies a subset of the first plurality of cells for which information is stored by the base station CU and/or identifies cells of the first plurality of cells for which information is not stored by the base station CU.

24. The apparatus of claim 23, wherein the response includes an instruction from the base station CU to activate the cells in the subset of the first plurality of cells.

* * * * *